United States Patent [19]

Maruo

[11] 4,239,068
[45] Dec. 16, 1980

[54] SCREW FEEDING APPARATUS

[76] Inventor: Kunimasa Maruo, 3-1-27 Nishi-Kojiya, Ohta-ku, Tokyo, Japan

[21] Appl. No.: 962,176

[22] Filed: Nov. 20, 1978

[30] Foreign Application Priority Data

Nov. 20, 1977 [JP]  Japan .................... 52-139202

[51] Int. Cl.³ ............................................. B23Q 7/12
[52] U.S. Cl. ...................... 81/462; 221/165; 221/200; 221/238; 221/264; 221/267
[58] Field of Search ............... 221/164, 165, 171, 180, 221/202, 204, 205, 238, 248, 251, 264, 267, 310, 200; 227/15, 18, 149; 81/57.37; 144/32

[56] References Cited

U.S. PATENT DOCUMENTS

| 1,195,571 | 8/1916 | Flaherty | 221/180 X |
| 1,813,697 | 7/1931 | Dellarez | 221/165 |
| 1,898,019 | 2/1933 | Reiter | 221/204 X |
| 2,471,793 | 5/1949 | Stull | 221/171 X |
| 3,357,617 | 12/1967 | Osborne | 227/149 X |
| 3,554,403 | 1/1971 | Ginther | 221/264 X |

Primary Examiner—Robert J. Spar
Assistant Examiner—Fred A. Silverberg
Attorney, Agent, or Firm—Fred Philpitt

[57] ABSTRACT

An apparatus for arranging and supplying screws comprising a trackway for aligning a plurality of screws, a conveyor for receiving aligned screws from said trackway, conveying them to a point of use and a regulator device for allowing only one screw at a time to be conveyed to the point of use of the screw.

8 Claims, 13 Drawing Figures

SCREW FEEDING APPARATUS

BACKGROUND OF THE INVENTION

Arranging means of the type above-mentioned heretofore widely used employs a system in which centrifugal force is utilized. More specifically, the known system utilizing the centrifugal force comprises the steps of dropping the screws or the like in the vicinity of the center of a dish-like member which is being rotated and causing the direction of the screws or the like to be arranged in order through making use of the difference in configuration and in weight between the head portion and the column portion of the screws or the like while the screws or the like are being caused to transfer toward periphery of the dish-like member under the influence of the centrifugal force; the disc-like member may alternatively be oscillated in lieu of rotation.

These prior systems, however, have a drawback in that they are exaggeratedly large in their dimensions and heavy; this comes from the fact that the means to rotate or to oscillate should relatively be of greater power and thus the mechanism to work in association with such rotate or oscillate means should correspondingly be of sufficient mechanical rigidity. Another drawback of the prior systems will be that the systems, particularly the dish-like member thereof, should be installed only in a horizontal place or in a place with a fixed angle, this being due to the arrangement means employed therein where, as explained above, the screws or the like are designed to be arranged in order by their own weight, that is, the installment of the prior systems is limited to a fixed place. This will be disadvantageous to the case where the systems are required to be easily transferred by the user, when, for instance, the systems are to be used in the manual assembling of machinery and tools or of woodwork where frequent transference of the systems is inevitable.

It is noted that the prior systems convey the screws or the like to the destined place by their own mechanism or by the help of other supplying device. The screws or the like so conveyed, however, should temporarily be kept by the forward end of a screw driver in the case where it is intended that the screws or the like are tightened consecutively by an electro-motive screw driver. Consideration should also be given to the case where the screws or the like are to be tightened to a deeper and/or narrower place, to say nothing of a horizontal place.

Accordingly, it is an object of the present invention to provide an apparatus for arranging and supplying screw or the like, which is small in size, not heavy, easily transferable and can be used even in a declined state.

Another object of the present invention is to provide an apparatus which requires only a relatively small power to drive and which can easily be associated with other means, such as an electro-motive driver or the like.

A further object of the present invention is to provide an apparatus wherein an arrangement is made to send the screws or the like out individually toward the supplying portion in response to an action requiring or ordering supply of the screws or the like.

A still further object of the present invention is to provide an apparatus which can supply the screws or the like even into a deep place where a tapped hole is formed.

BRIEF DESCRIPTION OF THE DRAWINGS

The nature of the present invention will become more fully apparent from a consideration of the following description of exemplary embodiments thereof, taken in conjunction with the accompanying drawings, in which:

FIG. 9 is an enlarged exploded perspective view of other important mechanism of the apparatus shown in FIG. 7;

FIG. 10 is a side view, partly in section, showing how the mechanism in FIG. 9 is assembled;

DESCRIPTION OF THE PREFERRED EMBODIMENTS

In FIGS. 1 through 6 showing one embodiment according to the present invention, reference numeral 2 designates a hopper to store screws or the like, the hopper 2 being supported by two sheets of side plates installed in parallel with each other, both designated by a reference numeral 1. Designated by reference numeral 3 are two thread screws. Each of these screws 3, 3 is threaded into each of an opening provided oppositely in each of the side plates 1, 1 and is fixed at its threaded position by means of fastening nuts 4, 4. Forward ends of these thread screws 3,3 form conic pivot shafts 5,5, a first oscillating member X is disposed therebetween and is supported thereby so as to be freely oscillative.

The first oscillating member X represents a fan shape designed to be freely oscillative around its pivoted center, the member X comprising a pair of outer plates 9 each consisting of two sheets of fan shape plates 8 and a spacer 8' provided between each pair of fan shape plates 8. A core plate 6 is interposed between the outer plate 9 and 9. The core plate 6 is of thickness greater than the diameter of a threaded shaft of the screws or the like to be sent out, but not greater than the diameter of a head of such screws or the like. The upper side edge of the core plate 6 is designed to be lower than the side edges of the outer plates 9 surrounding the core plate 6, so that the gap therebetween provides a depth of about the length of a threaded shaft of the screws or the like. That is, with the arrangement as mentioned above, inner side of the head of the screws or the like hits against the side edges of both of the outer plates 9, 9, whilst the threaded shaft thereof falls into a deep groove 10 provided by the core plate 6 and the outer plates 9, 9 and then the screws or the like slide along such deep groove 10, as will be understood from FIGS. 5 and 6. Such groove 10 to allow the screws or the like to slide therethrough, which consists of some few plate members piled up with each other, may alternatively be constituted by cutting an integral metal material or by shaping other materials into such groove.

In the center of a funnel-like inclined plate 11 of the hopper 2, there is provided an opening 12 which is large enough to allow the first oscillating member X to enter thereinto.

It is designed that the mutual relationship between the hopper 2, particularly the opening 12 thereof, and the first oscillating member X will be as follows:

With the upperward movement of the first oscillating member X around its pivoting point as the center, the upper end of the outer plate 9 moves into the hopper 2 through the opening 12 and the groove 10 is tilted with respect to the portion of the oscillating member X supported by the pivot shafts 5,5 whilst when the oscillating member X is in its lowest position, the upper end of the outer plate 9 is to be in a position adjacent to the area of the opening 12 of the hopper 2.

A shaft 14 is provided in the upper end portion 13 of the side plates 1,1 and a second oscillating member Y is pivotably connected to the shaft 14. The second oscillating member Y will be explained as follows.

The oscillating member Y comprises two sheets of fan shape outer plates 16, 16 arranged in parallel with each other with a fixed space therebetween. A separator 15 is disposed between the plate 16 and 16. The separator 15 is designed to have thickness greater than the diameter of the head of the screws or the like whilst such thickness corresponds substantially to the entire thickness of the first oscillating member X referred to above. On the upper end of the fan like outer plates 16, 16 adjacent to the aforementioned pivoting point, a closing plate 17 is mounted in a manner to cover the space between the outer plate 16 and 16.

Both the first oscillating member X and the second oscillating member Y have pivoting center in the same side and of similar fan like exterior. These members X and Y are installed in such a manner that the member X is nipped by the member Y and a circular arc turning movement of one member overlaps partially with that of the other member. The members X and Y are connected with each other by means of a first connecting rod 18 one end thereof being connected pivotably to the member X and the other also pivotably connected to the member Y. It will thus be appreciated that the second oscillating member Y will be caused to oscillate around the shaft 14 toward the same direction of the member X in association with the oscillative movement of the member X.

It is designed that during the oscillative movement of both of the oscillating members X and Y, the forward end of the closing plate 17 mounted on the oscillating member Y always keeps some distance from the upper edge of the outer plate 9 of the oscillating member X to allow the head of the screws or the like to pass therethrough.

In the meantime, in one end of the side plates 1, 1, there is provided a guide frame 19 extending longitudinally with its lower portion being inclined.

The guide frame 19 constitutes a square sleeve having a cut-opened guide groove 20 in its side wall, such guide groove 20 being of dimension to allow only the threaded shaft of the screws or the like to pass therethrough, so that the head of the screws or the like may be retained within the frame 19 while the screws or the like are passing through the square sleeve.

On the upper end of the guide frame 19 and in the upward direction of the guide groove 20, there is provided a pair of guide plates 21, 21. Each of these guide plates 21, 21 is inserted into a split groove of the fan like plates 8, 8 constituted by the spacer 8' in the outer plate 9 of the first oscillating member X. It will thus be appreciated that the guide groove 10 of the first oscillating member X and the guide grooves 20, 20 of the side plates 1, 1 are connected with each other with the interposition of the guide plates 21, 21 to provide a chain of groove.

In the lower end of the guide frame 19, there is provided a screw bracket 22 which is made of a resilient material such as rubber and which is designed to suspend the head of the screw 7 reaching there passing through the guide frame 19 in a manner to be discussed later on.

In the upward direction of the side plates 1, 1, there is provided an adapter plate 23 on which an electric screw driver 24 is mounted, the driver 24 having a bit 25 extending toward the screw bracket 22 referred to above. A first pulley 26 is fastened to the bit 25.

Supported by the adapter plate 23 at one end to be freely rotatable and supported at other end by the inclined end of the side plate 1 to be also freely rotatable is a first power transmission shaft 27 to which a second pulley 28 is fastened. Designated by a reference numeral 29 and installed on the side plate 1 is a second power transmission shaft which rotatably carries a double pulley 30 consisting of two different size (large and small) pulleys. The first pulley 26 and the large sized pulley of the double pulley 30 is connected by means of an endless belt 31 which passes round these pulleys 26 and 30 via the second pulley 28.

The side plate 1 is provided further with a third power transmission rotary shaft 32 to the outer end of which a third pulley 33 is integrally attached and to the opposite outer end of which a basic end of a crank 34 is attached. An endless belt 35 stretches round the small-sized pulley of the double pulley 30 and extends to the third pulley 33, whereby rotation speed of the bit of the electric screw driver 24 is diminished and such diminished speed of rotation is then conveyed to the third power transmission rotary shaft 32.

The free end of the crank 34 is pivotably connected to the lower end of the second connecting plate 36 by means of a pin 37. A pin 38 is attached to the upper end of the second connecting plate 36. The pin 38 passes through a crooked slit 39 provided in the side plate 1 and is connected to the outer plate 9 of the first oscillating member X.

With the arrangement of the driving mechanism as mentioned above, when rotary movement provided by the electric screw driver 24 is transmitted via pulleys and crank to the first oscillating member X in order to cause this member X to oscillate centering around the supporting point consisting of the pivot shafts 5,5, the second oscillating member Y will interlockingly be caused to oscillate, via the connecting rod 18, centering around the supporting shaft 14.

Reference will now be made to the operation of arranging and supplying the screws or the like according to the apparatus by the present invention.

Figure 1:
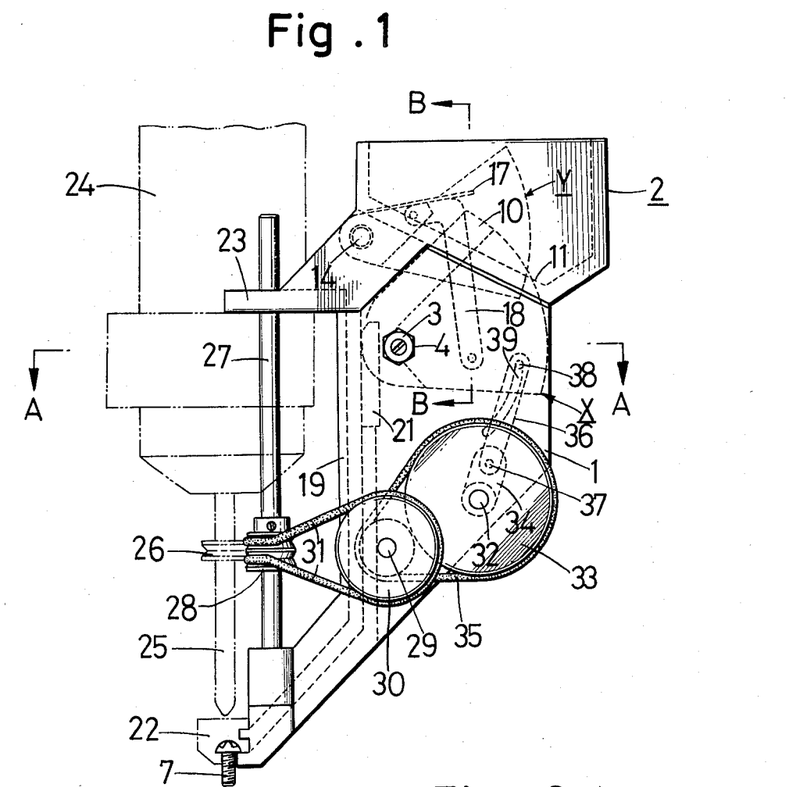
FIG. 1 is a side view showing one embodiment of the apparatus according to the present invention.
Figure 2:
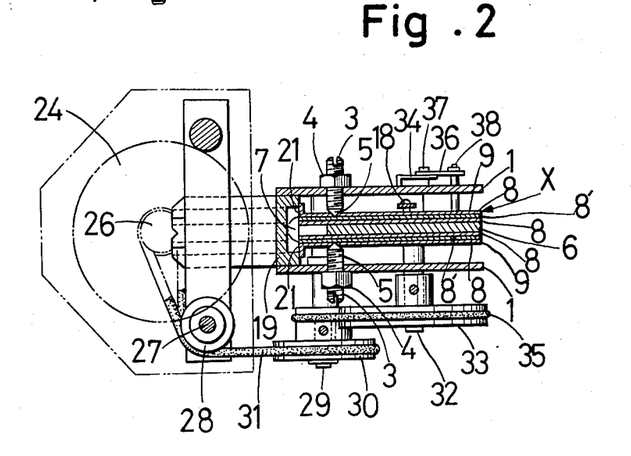
FIG. 2 is a top view taken along the lines A—A of the apparatus shown in FIG. 1.
Figure 3:
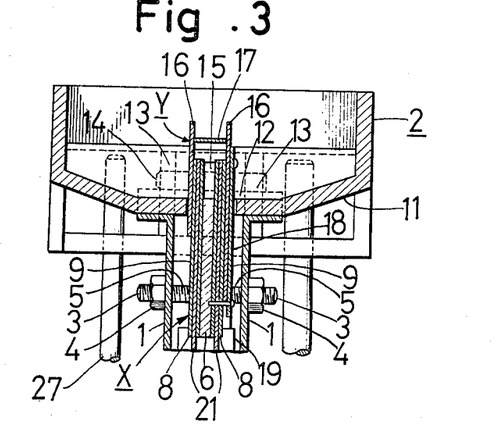
FIG. 3 is a side view taken along the lines B—B of the apparatus shown in FIG. 1.
Figure 4:
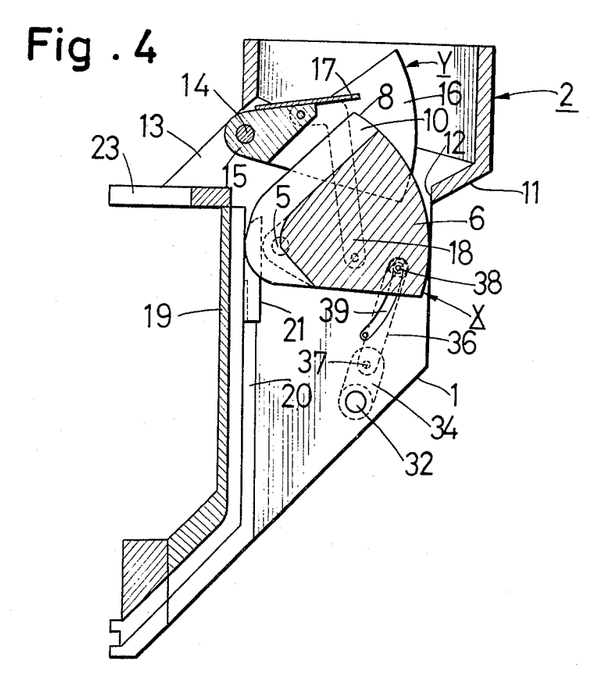
FIG. 4 is a longitudinal section showing the principal mechanism of the apparatus in FIG. 1.
Figure 5:
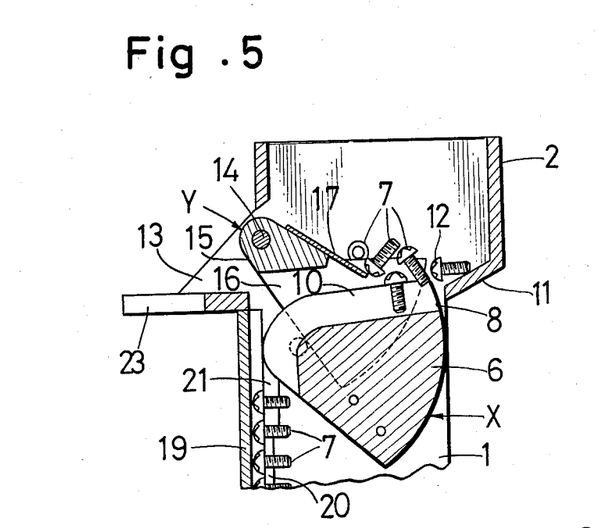
FIG. 5 and FIG. 6 are enlarged longitudinal sectional views respectively, each showing the operation of the principal mechanism of the apparatus in FIG. 1.
Figure 6:
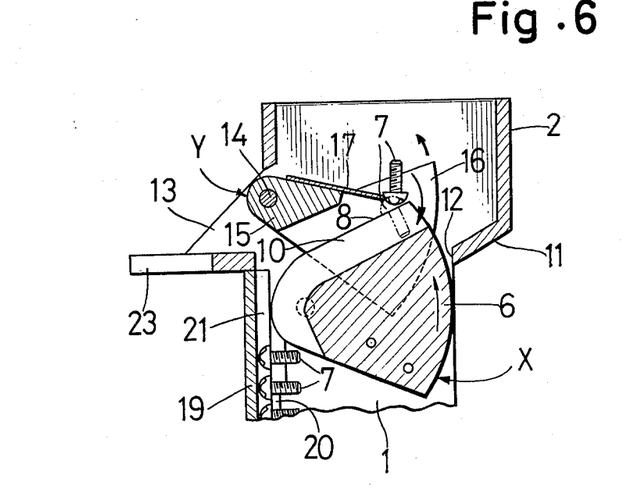

As will be understood from FIGS. 5 and 6 of the drawings, a number of screws 7, 7 . . . of a kind and of the same size are thrown into the hopper 2 in the first place. Secondly, the electric screw driver 24 is started, whereupon the first oscillating member X and the second oscillating member Y which are burried in a number of the screws 7, 7 . . . will, as explained above, be caused to oscillate in the hopper 2 and in the same direction, whereby the threaded shafts of some of the screws 7 will fall into the first guide groove 10 of the first oscillating member X whilst the head portions of such screws will remain on the upper end edge of the outer plate 9, as will be best seen from FIG. 5.

The forward end of the closing plate 17 of the second oscillating member Y will, following the oscillative movement of both the oscillating members X and Y, reciprocate in a space with a distance of about the thickness of the head portion of the screws from the upper end edge of the outer plate 9 of the first oscillating member X. The closing plate 17 will therefore not have direct influence on the screws 7 the threaded portions of which are in the first guide groove 10 with their head portions being hung on the upper end edge of the outer plate 9.

The screws 7 thus fallen into the groove 10 will then be caused to slide on the upper end edge of the outer plate 9, by the oscillative movement of the first oscillating member X to incline upwardly the groove 10 as is seen in FIG. 6, in the direction of the guide plates 21, 21 and be further conveyed along the guide frame 19. The screws 7 will then come down along the guide frame 19 and one of such screws which comes down foremost will be received by the screw bracket 22 provided in the lower end of the guide frame 19, remaining screws being to be accumulated within such frame 19 in regular and consecutive order.

In the meantime, arrangement is made to push the screws, excepting the screws of which the threaded shafts already fell into the first guide groove 10, away from the outer plate 9 by means of the closing plate 17, as will best be understood from FIG. 6. More specifically, the screws which are on the first oscillating member X without their threaded shafts being taken into by the first guide groove 10, i.e. the screws, standing on their heads, inclined or being in a recumbent posture, will be prevented from advancing into the guide groove 10 by means of the closing plate 17, since the forward end of the closing plate 17 is designed to move with respect to the outer plate 9 with certain distance therebetween higher than the thickness of the head of the screws but not exceeding such height. Those screws which are with such dispersed order as mentioned above will continuously be pushed away by the closing plate 17 to move interlockingly with the oscillative and stirring movement of both of the oscillating members X and Y in the hopper 2, until their threaded shafts fall into the first guide groove 10.

The apparatus according to the present invention can freely be used in a tilted condition without being too nervous about the vertical holding thereof, since the screw arranging and sending-out mechanism of the apparatus will not be affected even if the apparatus per se is inclined to the extent necessary to cause the screw 6 of which the threaded shaft has fallen into the first guide groove 10 to slip further into the second guide groove 20 by its own gravity. In the case where a number of screws 7, 7 . . . have already fallen into the second guide groove 20, the apparatus can be used in a further inclined state.

An actual screwing in operation by the use of the apparatus according to the present invention will be that the screw 7 disposed in the screw bracket 22 is pushed down against a hole by means of the electric screw driver 24 whereby the screw bracket 22 made of elastic material is caused to transform to let the screw 7 slip out, the screw 7 so slipped out of the bracket is screwed further into the hole by the electric screw driver 24 in operation, and the electric screw driver 24 is withdrawn from its contact with the screw 7 to finalize the operation.

Figure 7:
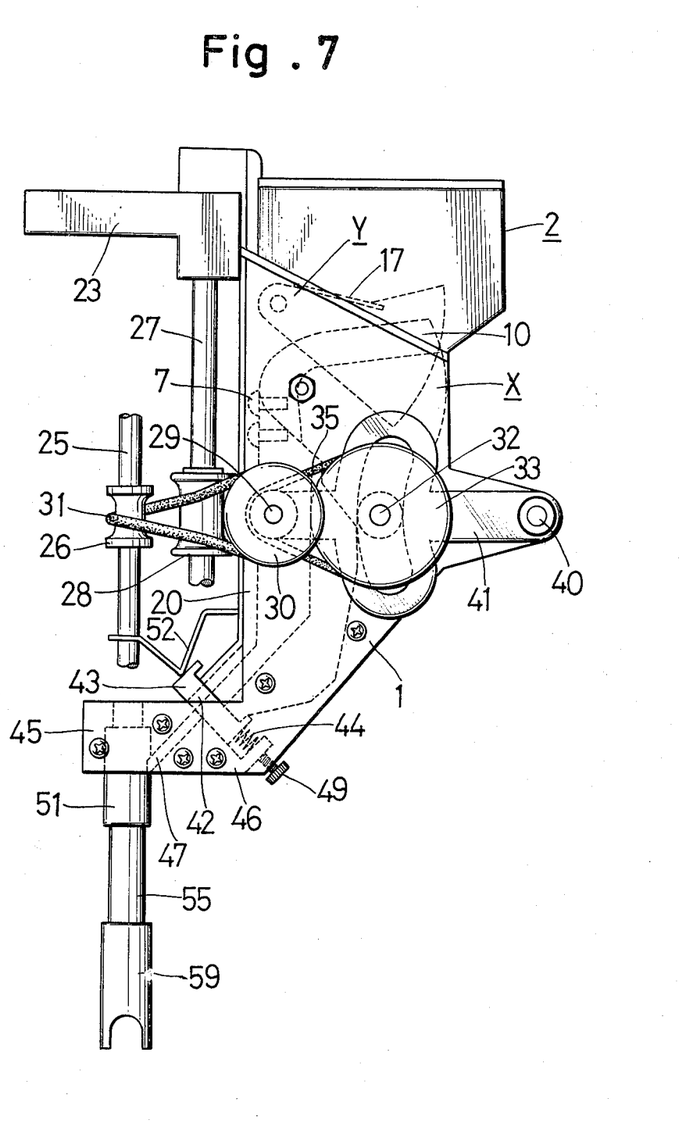
FIG. 7 is a side view showing other embodiment of the apparatus according to the present invention.

Reference will now be made to another embodiment of the present invention shown in FIG. 7 wherein elements similar to those of the first embodiment are given similar reference numerals to simplify the explanation.

In this embodiment, the second pulley 28 is fastened to the shaft 27 so as to be slidable vertically on the shaft, further the double pulley 30, the third pulley 33 as well as their second and third power transmission rotary shafts 29, 32 are attached to the whirling plate 41 which is pivotably supported by the shaft 40 mounted on one end of the side plate 1. This arrangement aims at making the apparatus applicable even to the case where a hole into which the screw is to be screwed is deep and the electric screw driver 24 should be provided with a long bit 25 to move into such a deep hole.

Other arrangement and sending-out mechanism according to this second embodiment is almost of the same one with that of the first embodiment.

Figure 8:
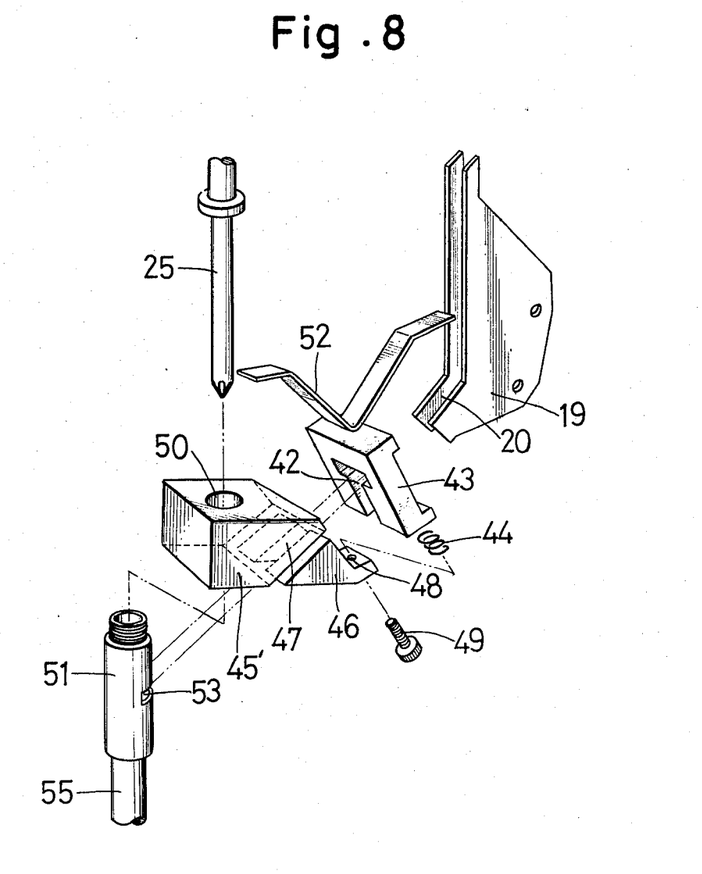
FIG. 8 is an enlarged exploded perspective view of one principal mechanism of the apparatus shown in FIG. 7.

In the lower direction of the second guide groove 20, there is provided a mechanism for sending out the screws . . . individually, as shown by the exploded perspective view in FIG. 8. In the forward direction of such mechanism for sending out the screws individually, a screw receiving mechanism is further provided as shown in FIGS. 9 and 10.

Such mechanism for sending out each screw separately comprises a first hole 42 through which the screw 7 is to pass, the first hole 42 being of configuration substantially same as that of section of the screw 7. A gate plate 43 constituting the first hole 42 is of thickness substantially same as that of the screw 7. The first hole 42 and the gate plate 43 are installed adjacent to the upper and lower end edges of the guide frame 19 in order to provide a zone to control the movement of the screw. A coiled spring 44 is provided under the gate plate 43 and when the gate plate 43 is caused to be elevated by the coiled spring 44, the hole 42 will be in an axis out of path of the screw 7 moving down along the guide groove 20.

A second hole 47 is formed through combining two members 45 and 46. The second hole 47 is designed to be in alignment with the first hole 42 when the gate plate 43 is in its elevated position.

The member 46 is provided with a screw hole 48 into which a screw 49 is to be screwed, the screw 49 being to act both as a supporter for the coiled spring 44 and as a member to control a descent position of the gate plate 43.

The member 45 is provided with a through hole 50 into the lower end of which one end of the pipe 51 is screwed to fix.

Fixed at one end to the side plate 1 and extending other free end thereof into the zone under the first pulley 26 of the bit 25 is a resilient member 52, the middle portion of such resilient member 52 being arranged to be in contact with the upper end of the gate plate 43.

Accordingly, when the bit 25 moves down and the resilient member 52 is pressed down by the edge of the first pulley mounted on the bit 25, the gate 43 will forcibly be pressed down by the middle portion of the resilient plate 52 against the spring force of the coiled spring 44. The gate plate 43 will be pressed down till the position priorly set by the length of the threaded shaft of the screw 49 screwed into the hole 48 and in this state where the gate plate 43 has been lowered, one of the screw 7 falls into the first hole 42 which is located in a position in alignment with the second guide groove 20. In this instance, it is to be noted that since the second hole 47 and the first hole 42 are not in alignment with each other, the screw 7 does not move further into the hole 47 but remains in the first hole 42 of the gate plate 43.

When the bit 25 is elevated to its original position, the gate plate 43 will be freed from the pressing-down force provided by the resilient plate and will return to its original position by the spring force provided by the coiled spring 44. With the returning movement of the gate plate 43, the first hole 42 will be in alignment with the second hole 47, whereby the screw 7 which has been held within the first hole 42 will slip into the second hole 47 by its own gravity.

The screw 7 so slipped into the second hole 47 will move further into the pipe 51 via a chute hole 53 provided in one portion of such pipe 51.

As will be seen from FIGS. 9 and 10, the screw receiving mechanism comprises generally the pipe 51 having a spiral fluted 54 to be screwed into the through hole of the member 45 and the chute hole 53, and a long pipe 55 designed to guide the screw 7 coming thereinto through the chute hole 53.

An elastic linear member 56 is provided along the outer circumferential surface of the long pipe 55, one end of such linear member 56 being fixed to the upper portion of the long pipe 55, other free end thereof being bent to extend into the long pipe 55 via a cutaway space 57 formed in the lower end of the pipe 55. Several pieces of such elastic linear members are arranged around the long pipe 55 at a certain space between each linear member.

In the circumferential region of the lower portion of the long pipe 55, several small holes 58 are provided. A steel ball 59 with a diameter slightly larger than those of the small holes 58 is forced into each of the holes 58, an outer sleeve 60 being disposed in a manner to cover such balls 59 and the holes 58.

The outer sleeve 60 contains two different inside diameters, the inside diameter of the upper portion being designed to be slightly larger than that of the lower portion. Usually the upper portion with larger inside diameter of the outer sleeve 60 will be in a position adjacent to the steel ball 50 and thus the steel ball 59 is maintained in its position not to enter into the long sleeve 55 passing through the small hole 58. The outer sleeve 60 is supported by a pin 62 extending from the exterior surface of the outer sleeve into a longitudinal groove 61 provided in the wall of the long pipe 55. Usually the outer sleeve 60 is in its lowest position with respect to the long sleeve 55 due to its own gravity, as will be seen in FIG. 10.

The screw 7 fallen into the long pipe 55 will be prevented, by means of the elastic linear members 56 extending into the pipe 55 in a manner as discussed above, from slipping out (refer to FIG. 10).

In operation, when the long pipe 55 in a state as mentioned is directed toward a screw hole which is in a deeper position of a machine or the like and when the same pipe 55 is pressed down against such screw hole, the outer sleeve 60 will firstly be forced up by the surface of the screw hole.

With the outer sleeve 60 being forced up as explained above, the steel ball 59 will be pushed in a direction toward inside of the long pipe 55 by means of the inner side of the outer sleeve 60 having smaller inside diameter. The steel ball 59, however, will be kept in the small hole 58 in a degree not to slip out of such hole into the long pipe 55. The steel ball 59 so maintained in the small hole 58 will act as a member to stop the head of the screw 7.

It will thus be appreciated that even if the outer sleeve 60 is greatly elevated and then the forward end of the threaded shaft of the screw 7 comes in touch with the edge of the screw hole, the screw 7 will continuously be maintained in the forward end of the long pipe 55 until the next stage to appear hereinafter.

With the electric screw driver 24 being lowered, the bit 25 comes in touch with the head of the screw 7 to screw it into the screw hole. In this connection, it should be noted that as the screw 7 is screwed into the screw hole, the elastic linear member 56 is forcibly opened by the head of the screw 7 so that the screw 7 may completely be out of contact with the long pipe.

After completion of screwing-in operation, the electric screw driver 24 is lifted together with the apparatus per se, whereupon the outer sleeve 60 moves down to its original position by its own gravity, as is shown in FIG. 10.

The above explained all about one complete screwing-in operation according to the second embodiment of the present invention. Any further repetition of such operation can be accomplished simply by following the explanation specified.

Reference will now be made to still another embodiment of the present invention by way of referring to FIGS. 11 through 13.

According to this embodiment, a screw receiving mechanism with particular construction is provided in a zone through which the bit 25 is to move.

Specifically, such screw receiving mechanism comprises a guide pipe 63 made of elastic materials such as metal or the like, one end thereof being fixed to an installation member 45'. The guide pipe 63 has at its upper wall an opening 64 to take in the screw, this opening 64 being designed to be in alignment with the second guide groove 47. The guide pipe 63 is of length to allow only the forward end of the bit 25 in its most lowered position to appear from the forward end opening and is further provided at its inner forward end, a circumferentially extending step 65 (refer to FIG. 12) to tentatively hold the head of the screw. The guide pipe 63 is additionally provided with several slots 66 each extending longitudinally from the forward end of the guide pipe.

An action plate 68 is pivotably connected to a shaft 67 of the stationary portion of the apparatus. Free end of such action plate 68 is designed to extend into a zone into which the screw is moving passing through the second guide groove 47. At one end of the action plate 68, there is provided a projection 69 which extends partially into the groove 47 from below of such groove and a pendent member 70 extending into the opening 64 formed in the upper portion of the elastic guide pin 63. A coiled spring 71 fixed at one end to the stationary member of the apparatus is attached to the other free end of the action plate 68, so that the action plate 68 may usually be kept in a moving range in which the pendent member 70 moves into the opening 64 of the elastic guide pipe 63. The intermediate edge of the action plate 68 is fixed movably to the forward end of the supporting rod 72 which is hanging down from the adapter plate 23 (refer to FIG. 1) for holding the electric screw driver 24, and is kept to be usually in a zone into which the end portion of the push down rod 74 moves down under the influence of the spring 73 provided on the supporting rod 72. The forward end of the spring plate 74 which will act on the gate plate 43 is also designed to be in the zone into which the push down rod 74 moves.

Figure 11:
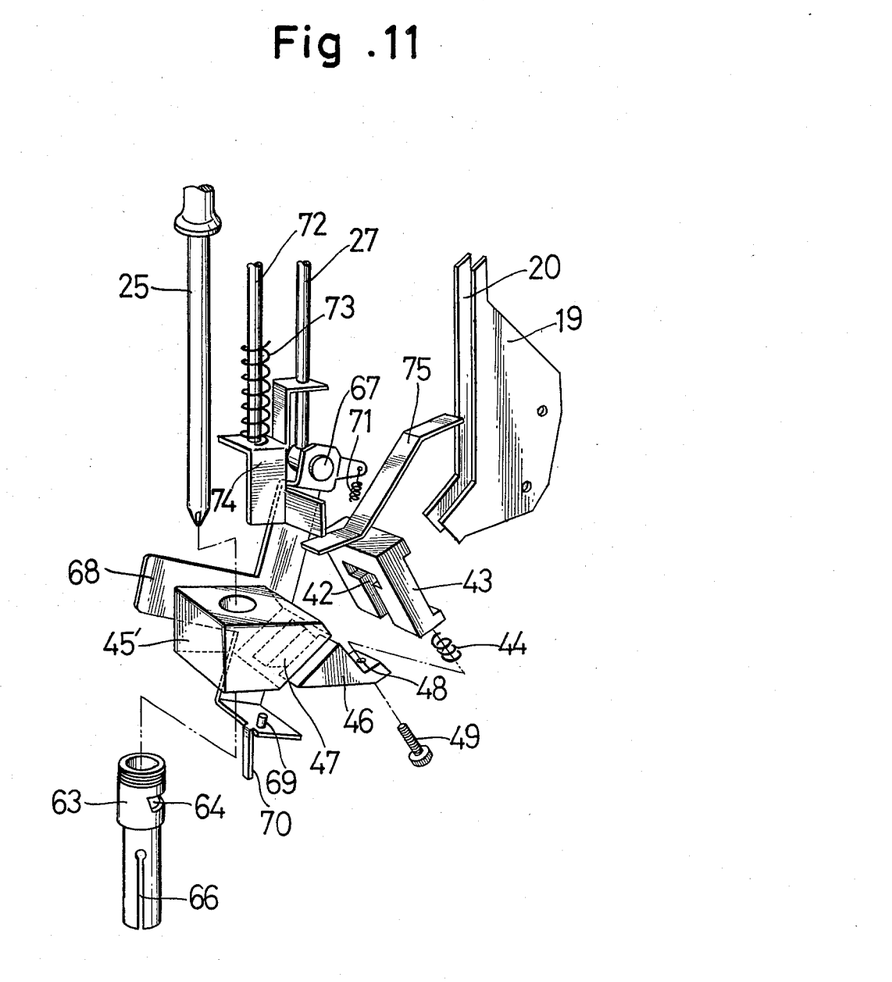
FIG. 11 is an exploded perspective view of a principal mechanism according to still other embodiment of the present invention.
Figure 12:
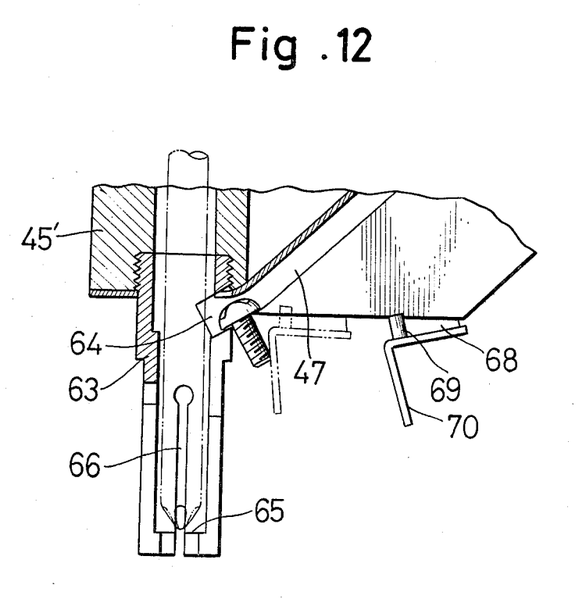
FIG. 12 and FIG. 13 are side views, partly in section, showing the operation of a guide pipe of the embodiment shown in FIG. 11.
Figure 13:
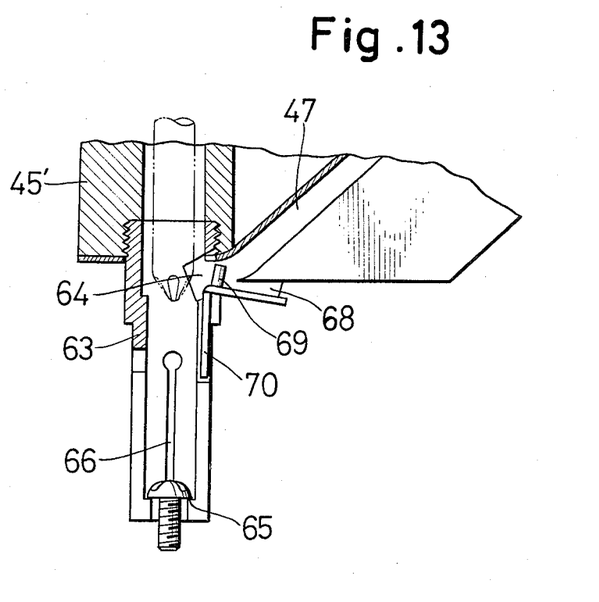

In operation, as the electric screw driver 24 is forced down together with the adapter plate 23, the bit 25 moves into the guide pipe 63 via the member 45′, the push down rod 74 provided in the forward end of the supporting rod 72 integrally fixed to the holder 23 also moves down, whereupon the gate plate 43 will, with the interception of the action plate 68 and the spring plate 75, forcibly be pressed down by the forward end of the push down rod 74 against the spring force provided by the coiled springs 71 and 44, as a result of which the action plate 68 will be caused to rotate counterclockwise with the shaft 67 as the center (as seen in FIG. 11) and the free end thereof is caused to move into a position as indicated by a solid line in FIG. 12, and a screw reaches the opening 64 of the guide pipe 63 passing through the second guide groove 47 (as seen in FIG. 12). It is to be noted in this instance that in the case where a screw has already fallen into the forward end of the guide pipe 63, the screw will be screwed into the hole by the rotative movement of the bit 25 while the difference between the moving range of the bit 25 toward screw fixing zone and the moving range of the push down rod 74 toward the action plate 68 as well as the gate plate 43 will be adjusted by the suspension of movement of the push down rod 74 by means of the spring 73 provided on the rod 72 which is to move down together with downward movement of the bit 25.

In the case where no screw has fallen into the forward end of the guide pipe 63 and the electric screw driver 24 is pressed down for the first time and then the driver 24 is pulled up immediately thereafter, the body of the apparatus including the screw installation member 45′ will be in its lowered position by its own gravity. With the bit 25 being pulled up, the push down rod 74 will concurrently move up and the action plate 68 will be caused to rotate clockwise by the spring force provided by the coiled spring 71 as seen in FIG. 11 whilst the projection 69 provided in the free end of the action plate 68 will partially move into the forward end zone of the guide groove 47 as indicated in FIG. 12 by the dot-dash-line and the pendent member 70 provided also in the same free end of the action plate 68 will move toward the opening 64 of the guide pipe 63 to push the screw at its side toward the opening 64 into the guide pipe 63 as seen in FIG. 13.

Consequently, the screw falls by its own gravity into the forward end of the vacant guide pipe 63 and is maintained temporarily at its neck by the step 65 formed on the inner wall of the forward end of the guide pipe 63.

When the electric screw driver 24 is pressed down, the next screw will come into the guide pipe 63 via the opening 64 while the screw previously fell into the forward end thereof is being screwed in by the driver. In the final stage of screwing-in operation by the apparatus according to the present invention, the forward end portion of the elastic guide pipe 63 will be expanded by the help of the slots 66 provided around the forward end zone of the pipe 63 in order to allow the screw to be out of contact with the step 65.

As fully discussed above, in the embodiment shown by FIGS. 11 through 13, arrangement is made so that the screws or the like coming individually into the guide pipe 63 is temporarily supported by such guide pipe 63; and arranging and sending such screws into the guide pipe 63 is accomplished by means of various members 68, 69, 70, 72, 73, 74 all of which are to move interlockingly with the development of the screwing-in operation for the screw previously sent into the guide pipe in order to ensure proper operation. Provided with the guide pipe 63 with unique construction as mentioned, apparatus of this invention can easily be applied even to the screw holes located in a deep and narrow place by inserting the guide pipe 63 into such deep and narrow place, to say nothing of application to the screw holes in a flat place.

It is also possible to utilize the apparatus to to loosen the screw from a screw hole. In such a case, a fastening screw having a knob, or the like, for instance, is provided between the adapter plate 23 and the supporting rod 27 and movement of the bit is fixed temporarily by said fastening screw in order to maintain the bit in a position with its forward end being extended out of the guide pipe, and then the electric screw driver 24 is controlled to rotate reversely to loosen the tightened screw from a screw hole.

Although the present invention has been described with reference to the embodiments in which only a screw is taken up as an example of an object to be arranged and supplied, it is to be understood that the invention is not limited to handle only such screw but is easily applicable to other objects, such as a bolt, a rivet or the like.

It should also be understood that the foregoing relates to only preferred embodiments of the invention, and that it is intended to cover all changes and modifications of the examples of the invention herein chosen for the purpose of the disclosure, which do not constitutes departures from the spirit and scope of the invention.

What is claimed is:

1. An apparatus for arranging and supplying screws, comprising a first oscillating member provided in an opening of a hopper and designed to guide the screws by taking threaded shafts of said screws into a guide groove while supporting said screws at their neck portions;

a second oscillating member also provided in said opening of said hopper and designed to move to and fro interlockingly with the movement of said first oscillating member apart from the upper portion of said first oscillating member by a distance substantially corresponding to the thickness of the head of said screws;

an elastic member provided in the forward end of a screw supporting means adapted to receive the screws individually each coming past through said guide groove and through a gate plate which is located in path of said screws and adapted to be closed or opened from outside of the apparatus;

a hole to receive therein a steel ball formed in the forward end portion of said screw supporting means, a distance between said hole and the forward end of said screw supporting member being arranged to be longer than at least the thickness of the head of said screws;

an outer sleeve provided around said forward end portion of said screw supporting means in a manner that the forward end of said outer sleeve extends beyond said forward end of said screw supporting means and both are slidable with respect to each other;

wherein said outer sleeve encircles said steel ball by its inner wall comprising a thin wall and a thick wall, said steel ball being pressed inwardly of said screw supporting means by means of said thick inner wall of said outer sleeve as the outer sleeve is moved on being contacted by the surface of the screw to be screwed in, whereby the screw being supported in the forward end of said supporting means is prevented by said steel ball from being elevated.

2. An apparatus for arranging and supplying screws comprising in combination:
(a) a first member located adjacent a storage area for a non-aligned mass of screws, said member having track means for receiving and aligning a plurality of screws in a linear row so that the screws are supported in the track means by their heads and the shafts of the screws extend downwardly from said track means,
(b) conveying means for receiving aligned screws from the track means of said first member and delivering said aligned screws to a point removed from said first member, where said screws are to be used,
(c) means for oscillating said first member from a first position, wherein said track means receive and align screws, through an arc to a second position wherein said aligned screws can slide down an inclined path under the influence of gravity to said conveying means,
(d) a second member located adjacent said first member, said second member having a section that is positioned a spaced distance away from at least a portion of the track means of said first member so as to limit the access of screws in said non-aligned mass of screws to the zone immediately overlying said track means, said spaced distance approximating the thickness of the head of a screw,
(e) means for oscillating said second member through an arc that intersects the arc through which said first member moves, and in conjunction with the movement of said first member so that as said first member moves from said first position to said second position, screws that are overlying said track means or improperly positioned on said track means will be cleared away from said track means so that the screws in the track means will not be hindered from sliding down an inclined path under the influence of gravity.

3. An apparatus according to claim 2 which additionally includes gate means in association with said conveying means for allowing one screw at a time to pass from said conveying means to the point of use of the screw, said gate means consisting of a plate and activating means for moving said plate into an out of obstructing relationship with a trackway that constitutes a part of said conveying means.

4. An apparatus according to claim 3 which includes a screwing bit for screwing a screw into an item at the point of use of the screw and said activating means is interconnected to said bit in such manner that downward movement of said bit into its screwing position causes said activating means to move said plate out of an obstructing relationship so that a single screw can complete its journey down said conveying means to the point of use of the screw.

5. An apparatus according to claim 2 wherein the outlet of said screw conveying means is connected to a screw receiving mechanism in the form of an elongated vertical cylindrical passageway, said passageway including means to receive, hold and position an individual screw for engagement with a screwing bit.

6. An apparatus according to claim 5 wherein said vertical cylindrical passageway is in two telescoping sections including an upper inner section and a lower outer section, the lower part of said inner section having a ball mounted in a hole in said inner section, the inner surface of said outer section being contoured so as to press said ball inwardly when said inner section is moved downwardly with respect to said outer section, the inward movement of said ball preventing substantial upward movement of any screw positioned in the lower part of said inner section.

7. An apparatus according to claims 5 or 6 wherein said means to receive, hold and position comprises at least one elastic linear member which extends inwardly toward the axis of said vertical elongated cylindrical passageway.

8. An apparatus for arranging and supplying screws comprising in combination:
(a) means for aligning a plurality of screws on a track means by their heads, with the shafts of the screws extending downwardly from said track means,
(b) screw conveying means for receiving aligned screws from said track means and delivering said aligned screws to a screw receiving mechanism,
(c) gate means for allowing one screw at a time to pass completely through said conveying means, and
(d) a screw receiving mechanism connected to the outlet of said screw conveying means, said mechanism being in the form of an elongated vertical cylindrical passageway, said passageway including means to receive, hold, and position an individual screw for engagement with a screwing bit, said passageway being in the form of two telescoping sections including an upper inner section and a lower outer section, the lower part of said inner section having a ball mounted in a hole in said inner section, the inner surface of said outer section being contoured so as to press said ball inwardly when said inner section is moved downwardly with respect to said outer section, the inward movement of said ball preventing substantial upward movement of any screw positioned in the lower part of said inner section.

* * * * *